J. SELBY.

CORN-PLANTER.

No. 7,083. Reissued April 25, 1876.

Witnesses:

Donn Turtchell.

W. E. Chaffee.

Inventor:

James Selby by his attys

Dodge & Son.

N. PETERS, PHOTO-LITHOGRAPHER, WASHINGTON, D. C.

UNITED STATES PATENT OFFICE.

JAMES SELBY, OF PEORIA, ILLINOIS.

IMPROVEMENT IN CORN-PLANTERS.

Specification forming part of Letters Patent No. 126,751, dated May 14, 1872; reissue No. 7,083, dated April 25, 1876; application filed August 2, 1875.

*To all whom it may concern:*

Be it known that I, JAMES SELBY, of Peoria, in the county of Peoria and State of Illinois, have invented certain new and useful Improvements in Corn-Planters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to corn-planters; and the invention consists of levers arranged to raise or lower the runners, and thus enable the driver to control the depth at which they shall enter the ground. It further consists of a stop or device arranged to operate in connection with the levers, by which they may be so locked as to hold the runners at any desired depth or height, according as they may be adjusted; also, in a novel arrangement of the driver's and dropper's seat, whereby they shall be made to counterbalance each other without affecting the depth of the runners, all as hereinafter more fully described.

Figure 1:
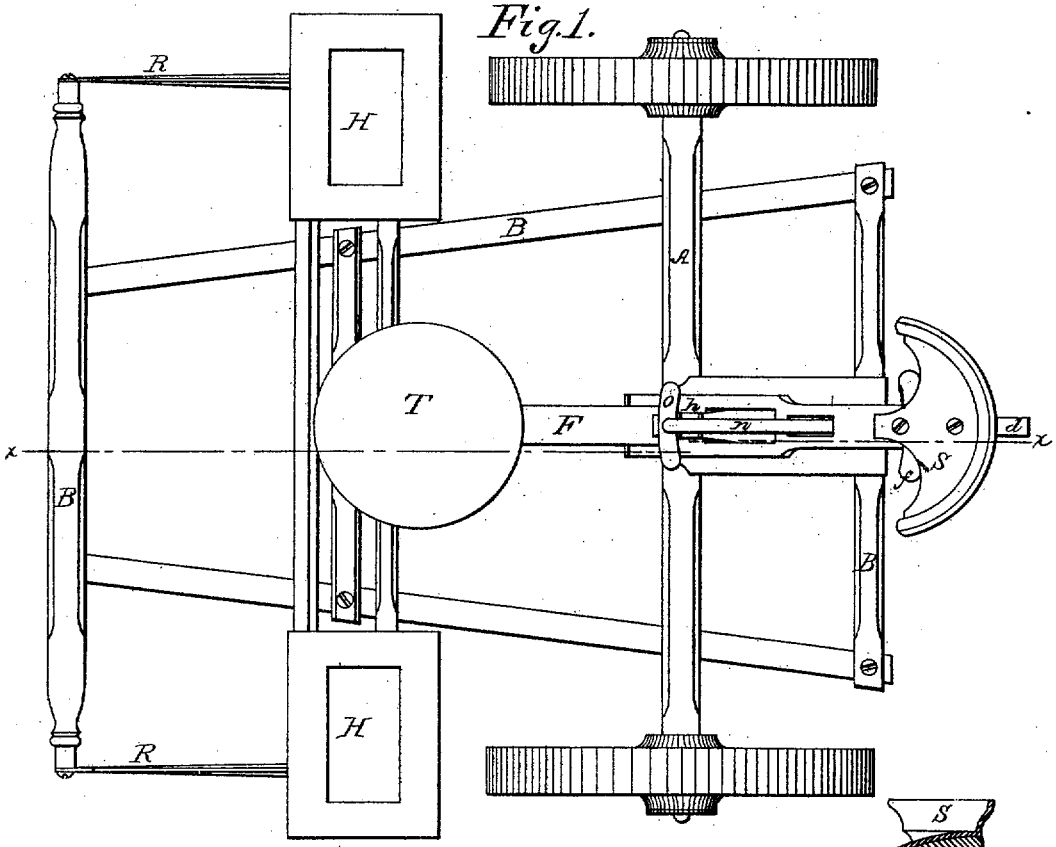
Figure 2:
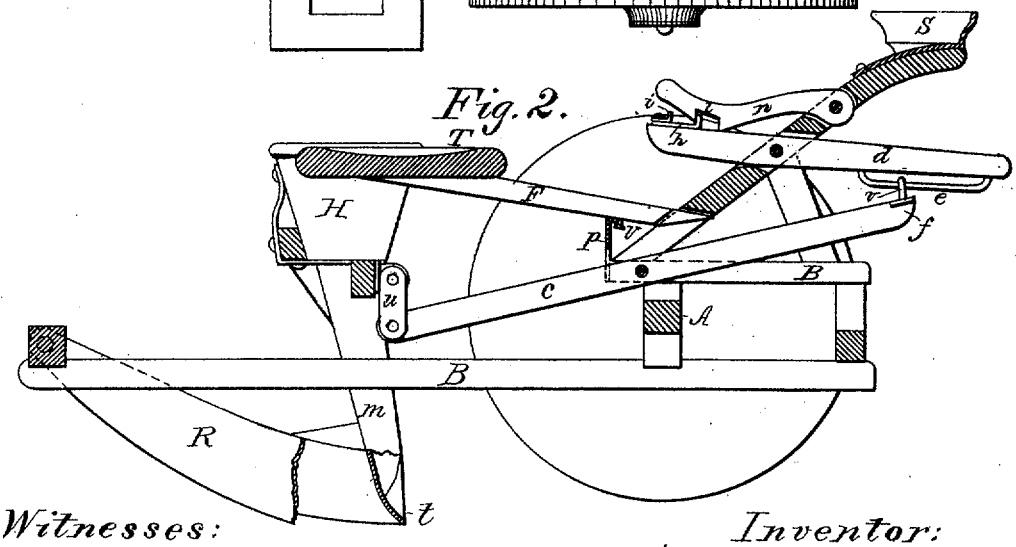
Figure 3:
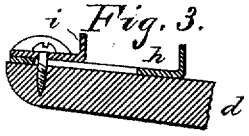

Figure 1 is a top-plan view, and Fig. 2 a longitudinal vertical section, of my improved machine. Fig. 3 is a sectional view of a portion shown detached and enlarged.

In constructing my planter I make the frame B rigid from end to end, and attach the tongue rigidly to the front part thereof, as shown in my patent dated August 30, 1864, numbered 44,019, to which reference is made for a more full illustration of the manner of attaching the tongue. This frame is mounted on an axle, A, with wheels near its rear end, and is supported at its front end by the tongue, the front end of which is supported by the neck-yoke of the team.

It will thus be seen that the frame is at all times supported in a uniform position, its two points of support being the wheels at the rear and the neck-yoke at the front.

The runners R are pivoted at their front ends to the front end of the frame, whereby their rear ends are free to play up and down, as may be desired, independent of the motion of the frame. The seed-hoppers H are mounted on the rear ends of the runners, as usual, and are connected thereto by seed-tubes *m*, as shown in Fig. 2. Over the axle A I pivot a lever, *c*, the front end of which is connected, by links *u*, to the hopper or runner frame, this lever extending back of the axle under the driver's seat S, where it is provided with a foot-piece, *f*, as shown in Figs. 1 and 2. In the standard which supports this seat I pivot another lever, *d*, the front end of which is provided with another foot-piece, *o*, as shown in Fig. 1. At their rear ends these levers *c* and *d* are connected by a loose joint, by which they are permitted to play freely one upon the other, as represented in Fig. 2.

In this case I have shown this joint as composed of an eye or staple, *v*, fastened to one of the levers, and working freely on a rod, *e*, attached to the other lever; but it is obvious that any other form of joint which will admit of a free movement of the levers may be used instead. With this arrangement of levers the driver can control the runners as he pleases. By pressing on the rear end of lever *c* he can raise the runners to any desired extent, so as to prevent them from cutting too deeply into the soil, or can raise them entirely clear of the ground when desired to do so. By pressing on the front end of lever *d* he can, in like manner, depress the runners and press them into the ground to any desired extent, which is oftentimes necessary when the ground is dry or hard, or when planting on sod-ground. If left in this condition it would require the constant attention of the driver to keep the runners in their proper position, and so, in order to relieve him and make the machine more automatic in its operation, I provide a means for locking the levers, and thereby the runners, in any position to which they may be adjusted, whether up or down. This locking device consists of a latch, *n*, pivoted to the seat-standard, as shown in Fig. 2. Near its front end this latch is provided with an elongated notch, *l*, in which engages a projecting stop or catch, *h*, which is secured to the lever *d* near its front end, as shown in Fig. 2. This stop *h* is slotted longitudinally, and is secured by a set-screw or bolt, as shown in Fig. 3, by which means it can be moved forward or back, and thus be adjusted so as to hold the levers, and thereby the runners, higher or lower, as may be required. In addition to this, I secure a permanent stop, *i*, on the lever *d*, in front of the stop *h*, by which, when the latch *n* is locked thereon, the runners will be held elevated clear from the ground, as is necessary in going to and from the field, and in similar cases, the suspension of the runners, in turning at the end of the rows, being usually accomplished by the pressure of the driver's foot on the rear end of lever *c* without the use of the locking device.

It will be observed that the notch *l* is elongated to allow of same movement or play of the levers, which is for the purpose of permitting the runners to adapt themselves to the inequalities of the surface, which they could not do if locked at all times in a fixed position. By means of the levers and the locking devices it will be seen that the parts may be so adjusted as to hold the runners suspended from the ground, or pressed into it, to any required depth, or at any point intermediate between these two extremes, the locking device serving to lock them up or down.

The seed-tubes M, through which the seed passes from the hoppers to the ground, are inclined backward and are open at their lower end on their back side. A plate, *t*, is secured at the lower end of these tubes, and has its lower end curved or slanted backward, as shown in Fig. 2. As the corn or seed falls from the hopper through the tube *m* it will strike upon this plate *t* and be thrown backward, thereby counteracting or compensating for the forward movement of the machine while the seed is falling from the hopper to the ground, and thus the seed will be dropped at the point over which the hopper was at the instant the valve was moved. By this means the seed can be deposited with greater accuracy in check rows or hills, thereby making the rows both ways more nearly straight, and greatly facilitating the after culture of the crop. By slanting the tube backward, and causing the seed to pass out at the rear side thereof, it is brought within sight of the dropper, who is thus enabled to know definitely whether the seed is dropped or not.

The dropper's seat T is secured upon an arm, F, as shown in Figs. 1 and 2, it being in front of the axle, while that of the driver is in rear of the same, whereby the weight of one is made to counterbalance that of the other, and as the frame is rigid and has its front end supported by the rigid tongue, as previously described, it will be seen that the weight of the dropper in front of the axle in no way affects the runners, as it would if the frame was a jointed one, with the runners rigidly attached to the front part thereof.

As these machines are sometimes used for planting corn in drills or continuous rows instead of hills, in which case the dropper is not required (a drilling apparatus being substituted for the hand-slides) I make the front or dropper's seat detachable, so it can be removed when not required for use. This is accomplished by constructing the rear end of its supporting-arm F with a tenon to fit in a mortise in the standard of the driver's seat, and supporting the arm F on a bracket or support, *p*, as shown in Fig. 2, there being a bolt, Y, or any similar device to prevent the seat from being accidentally disengaged.

While I have shown my improvements as applied to a rigid frame, it is obvious that the levers which control the runners may be applied to those machines which use a jointed frame, and made to operate in the same or a similar manner. This method of controlling the runners by levers is very important, as it gives the driver the means of pressing the runners into the soil, and thereby regulating the depth at which the seed is planted, whether a dropper be employed or not, and thus, by the use of this feature of my improvement, that class of machines, in which the weight of the dropper is relied upon to regulate the depth of the runners, can be readily converted into drilling-machines, and the dropper dispensed with.

Having thus described my invention, what I claim is—

1. The combination, in a corn-planter, of the levers *c* and *d*, arranged to operate substantially as described, whereby the driver is enabled to press the runners into the ground, or raise them therefrom, as set forth.

2. In combination with the levers *c d*, arranged to operate as set forth, a locking device, whereby the levers can be locked in position to regulate the depth that the runners shall enter the ground, as set forth.

3. In combination with the levers and latch *n*, an adjustable stop, *h*, for regulating the position at which the runners shall be locked, substantially as described.

4. The arrangement of the seat S and the levers *c d*, substantially as shown and described, whereby the driver can operate the levers by his feet, both to raise and lower the runners, and also lock and unlock the parts, as set forth.

5. In combination with the rigid frame, having the runners pivoted thereto, the two seats, arranged on opposite sides of the axle, whereby the weight of the driver and dropper are made to counterbalance each other without affecting the runners, as set forth.

JAMES SELBY.

Witnesses:
M. D. SPURCK,
A. B. FINK.